United States Patent
Amrany et al.

(10) Patent No.: US 11,494,800 B2
(45) Date of Patent: Nov. 8, 2022

(54) SYSTEM AND METHOD FOR CAPABILITY PACKAGES OFFERING BASED ON ANALYSIS OF EDITED WEBSITES AND THEIR USE

(71) Applicant: Wix.com Ltd., Tel Aviv (IL)

(72) Inventors: Orly Amrany, Tel Aviv (IL); Omri Yunger, Tel Aviv (IL); Elad Kaisi, Tel Aviv (IL); Shai Lavie, Tel Aviv (IL); Itay Shmool, Tel Mond (IL)

(73) Assignee: Wix.com Ltd., Tel Aviv (IL)

( * ) Notice: Subject to any disclaimer, the term of this patent is extended or adjusted under 35 U.S.C. 154(b) by 327 days.

(21) Appl. No.: 16/785,691

(22) Filed: Feb. 10, 2020

(65) Prior Publication Data
US 2020/0184508 A1    Jun. 11, 2020

Related U.S. Application Data

(63) Continuation of application No. 15/168,295, filed on May 31, 2016, now Pat. No. 10,558,998.

(60) Provisional application No. 62/168,838, filed on May 31, 2015.

(51) Int. Cl.
*G06Q 30/02* (2012.01)

(52) U.S. Cl.
CPC ..... *G06Q 30/0239* (2013.01); *G06Q 30/0222* (2013.01)

(58) Field of Classification Search
CPC .............. G06Q 30/0239; G06Q 30/0222
See application file for complete search history.

(56) References Cited

U.S. PATENT DOCUMENTS

| | | | |
|---|---|---|---|
| 8,819,122 B2 | 8/2014 | Ravichandran et al. | |
| 2002/0035579 A1 | 3/2002 | Wang et al. | |
| 2002/0062245 A1 | 5/2002 | Niu et al. | |
| 2004/0268413 A1* | 12/2004 | Reid ............... | H04N 21/47 348/E7.071 |
| 2005/0125308 A1 | 6/2005 | Puentes et al. | |
| 2007/0143181 A1 | 6/2007 | Linkner | |

(Continued)

FOREIGN PATENT DOCUMENTS

| | | |
|---|---|---|
| WO | 2008094712 | 8/2008 |
| WO | 2015029073 | 3/2015 |
| WO | 2015083115 | 6/2015 |

OTHER PUBLICATIONS

Www.webs.com, Website Maker Pricing and Packages—Start Free or Go Premium Webs, Mar. 14, 2014, https://www.webs.com/plans, pp. 1-4 (Year: 2014).*

(Continued)

*Primary Examiner* — John Van Bramer
(74) *Attorney, Agent, or Firm* — Heidi Brun Associates Ltd.

(57) ABSTRACT

A system for a website building system server, the server having at least one processor and a memory, the system includes: an analyzer and updater to construct a promotional package for a user of the website building system according to at least editing history and/or business intelligence of a website belonging to the user, a channel determiner to determine the best mode of interface to present the promotional package to the user and a marketer to modify the website building system interface for the user according to the best mode of interface.

18 Claims, 12 Drawing Sheets

(56) References Cited

U.S. PATENT DOCUMENTS

| | | | |
|---|---|---|---|
| 2011/0023017 A1* | 1/2011 | Calvin | H04L 67/02 |
| | | | 717/120 |
| 2011/0153432 A1 | 6/2011 | Forbes | |
| 2013/0024290 A1 | 1/2013 | Berg et al. | |
| 2013/0085804 A1* | 4/2013 | Left | G06Q 30/0201 |
| | | | 705/7.29 |
| 2013/0219263 A1* | 8/2013 | Abrahami | G06F 40/117 |
| | | | 715/234 |
| 2014/0006930 A1* | 1/2014 | Hollis | G06Q 50/01 |
| | | | 715/234 |
| 2014/0249911 A1 | 9/2014 | Znerold et al. | |
| 2014/0282218 A1* | 9/2014 | Kaufman | G06F 40/186 |
| | | | 715/781 |
| 2014/0310691 A1 | 10/2014 | Ou | |
| 2016/0124839 A1 | 5/2016 | Mordo et al. | |

OTHER PUBLICATIONS

International Search Report for corresponding PCT application PCT/IB2016/053192 dated Sep. 16, 2016.
Supplementary European Search Report for corresponding European application 16 802668.0 dated Oct. 22, 2018.

* cited by examiner

FIG. 7

| BEST VALUE<br>Yearly<br>Savings Plans<br>⊙ Free Domain<br>⊞ Free Premium Apps | eCommerce<br>Best for Small Business<br>US$ 16$^{17}$/month<br>~~US$24.90~~ Save 35%<br>1 Year<br>2 Apps – $118 Value<br>○ | POPULAR<br>Unlimited<br>Entrepreneurs & Freelancers<br>US$ 12$^{42}$/month<br>~~US$22.90~~ Save 45%<br>1 Year<br>2 Apps – $118 Value<br>[Buy Now] | Combo<br>For Personal Use<br>US$ 8$^{25}$/month<br>~~US$12.90~~ Save 35%<br>1 Year<br>○ | Connect Domain<br>Most Basic<br>US$ 4$^{08}$/month<br>ⓘ This Plan Displays Wix Brand Ads |
|---|---|---|---|---|
| Monthly<br>Plans | US$ 19$^{90}$/month<br>○ | US$ 15$^{95}$/month<br>○ | US$ 10$^{95}$/month<br>○ | US$ 5$^{95}$/month<br>ⓘ This Plan Displays Wix Brand Ads |

FIG. 9A

|  | 20GB | 10GB | 3GB | 500MB |
|---|---|---|---|---|
| Bigger Storage | | | | |
| Connect Your Domain | ✓ | ✓ | ✓ | ✓ |
| Google Analytics | ✓ | ✓ | ✓ | ✓ |
| Premium Support | ✓ | ✓ | ✓ | ✓ |
| Free Hosting | ✓ | ✓ | ✓ | ✓ |
| Remove Wix ads | ✓ | ✓ | ✓ | |
| Get a Free Domain* | ✓ | ✓ | ✓ | |
| No Mobile Ads | ✓ | ✓ | ✓ | |
| Customized Favicon | ✓ | ✓ | ✓ | |
| Google AdWords Voucher* | $75 | $75 | $75 | |
| Form Builder App* | ✓ | ✓ | | |
| Site Booster App* | ✓ | ✓ | | |
| Online Store | ✓ | | | |

Upgrade Your Site to a Yearly Unlimited Plan and Get a Free Domain
Only US$12.42/month. Save 45%

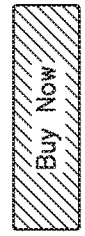

*Yearly Saving Plan only

FIG. 9B

SYSTEM AND METHOD FOR CAPABILITY PACKAGES OFFERING BASED ON ANALYSIS OF EDITED WEBSITES AND THEIR USE

CROSS REFERENCE TO RELATED APPLICATIONS

This application is a continuation application of U.S. patent application Ser. No. 15/168,295 filed May 31, 2016, which claims priority from U.S. provisional patent application 62/168,838, filed May 31, 2015 both of which are incorporated herein by reference.

FIELD OF THE INVENTION

The present invention relates to website building systems generally and to capability package offerings in particular.

BACKGROUND OF THE INVENTION

With the age of the Internet has come the use of website building systems that allow typically unskilled users to design and create interactive websites to market their products and services without the need of a programmer. Such website building systems typically provide a page visual editor (to visually create and edit the pages to be included in the created web site).

Existing website building systems typically offer different predefined service level packages for building websites or for improving already existing websites. These packages are often each manually defined by the website building system vendor—in terms of payments cycles, capabilities, etc.

These set packages can offer basic capabilities (e.g. limited hosting bandwidth and storage), as well as general-use premium capabilities (such as increased hosting limits or domain connection). They can also offer solution-specific premium packages (such as embedded hotel application with various limits on the number of supported rooms).

These set packages are typically offered to the website designer (i.e. the person using the pertinent web site building system to create a web site for his end users) via some form of marketing promotion. Such a promotion may be on-line (e.g. a social network or other banner advertisement) or off-line (e.g. a TV spot directing potential designer to a given time-limited campaign accessible through a published URL). The user would be directed to enter a given landing page, or enter the website building system and go to a page detailing the set package.

SUMMARY OF THE PRESENT INVENTION

There is provided, in accordance with a preferred embodiment of the present invention, a system for a website building system server, the server having at least one processor and a memory. The system includes an analyzer and updater to construct a promotional package for a user of the website building system according to at least editing history and/or business intelligence of a website belonging to the user; a channel determiner to determine the best mode of interface to present the promotional package to the user and a marketer to modify the website building system interface for the user according to the best mode of interface.

Moreover, in accordance with a preferred embodiment of the present invention, the promotional package is based on user and website parameters and pre-defined plans and rules.

Further, in accordance with a preferred embodiment of the present invention, the promotional package is based on current session parameters for an anonymous user.

Still further, in accordance with a preferred embodiment of the present invention, the promotional package includes at least one of: the pre-defined plan, additional offers, third party applications and vertical solutions.

Additionally, in accordance with a preferred embodiment of the present invention, the promotional package includes at least one of: a visual design and payment cycle information.

Moreover, in accordance with a preferred embodiment of the present invention, the pre-defined plan includes of at least one of features, limitations, plug-ins, advertisement behavior, domain connection information, templates and third party applications.

Further, in accordance with a preferred embodiment of the present invention, the best mode of interface is at least one of: via the website building system user interface and an individual digital communication channel.

Still further, in accordance with a preferred embodiment of the present invention, the system also includes at least one database to store the least editing history and/or business intelligence of the website belonging to the user, an offering editor server to receive edits to the pre-defined plans and rules from the vendor of the website building system, an internal A/B tester to apply A/B testing on at least one of: visual design, content and parameters of promotional packages provided by the website building system and a website building system UI (user interface) server to display the promotional package to the user.

Additionally, in accordance with a preferred embodiment of the present invention, the at least one database stores at least one of: the user and website parameters, vertical solutions, the pre-defined plans and rules, results of the internal A/B tester and results of marketing campaigns.

Moreover, in accordance with a preferred embodiment of the present invention, the system also includes a baseline configurer to configure a baseline plan based on the user and website parameters; a premium plan configurer to configure a premium plan based on the at least editing history and/or business intelligence parameters; a deal determiner to determine if there are current deals available as defined by a vendor of the website building system and a coupon determiner to determine if there are there are any current campaigns for the website as defined by a vendor of the website building system.

Still further, in accordance with a preferred embodiment of the present invention, the analyzer and updater includes an A/B test applier to apply results of results of the internal A/B tester.

Additionally, in accordance with a preferred embodiment of the present invention, the analyzer and updater includes a decision engine to apply the rules and plans based on the user and website parameters and the at least editing history and/or business intelligence parameters; a package assembler to create the promotional package based on the results of the baseline configurer, the premium plan configurer, the deal determiner, the coupon determiner, the A/B test applier and the decision engine together with visual design information and a coordinator to coordinate between the baseline configurer, the premium plan configurer, the deal determiner, the coupon determiner, the A/B test applier, the decision engine and the at least one database.

Moreover, in accordance with a preferred embodiment of the present invention, the decision engine includes at least one of: a rule engine to analyze at least to extract at least one pre-defined plan according to the pre-defined rules and where the rule engine performs a deep analysis of vertical solutions and third party applications associated with the at least one pre-determined plan and a machine learning engine to adapt the pre-defined rules according to analysis of the user and website parameters, the at least editing history and/or business intelligence parameters, associated vertical solutions and associated third party applications and where the rule engine and the machine learning engine analyze results of the internal A/B tester and results of marketing campaigns.

Further, in accordance with a preferred embodiment of the present invention, the machine learning engine instructs the internal A/B tester to test pricing schemes according to an external cause.

Still further, in accordance with a preferred embodiment of the present invention, the external cause is at least one of: currency rate fluctuations and competitor pricing.

Additionally, in accordance with a preferred embodiment of the present invention, the offering editor server includes a matrix manager to create and maintain a multidimensional matrix of promotional packages and plans and other data structures based on the user and website parameters and the at least editing history and/or business intelligence parameters; an element/metadata editor to receive edits to the pre-defined rules and plans from a vendor of the website building system and a page designer to create a visual layout to present the promotional package to the user.

Moreover, in accordance with a preferred embodiment of the present invention, the page designer is based on a page visual editor of the website building system.

Further, in accordance with a preferred embodiment of the present invention, the marketer includes at least one of: an individual digital communicator to inform the user of the promotional package via an individual digital communication channel; a coupon creator to create a coupon for the promotional package and to display it on the user interface pages of the website building system; a banner creator to create a banner for the promotional package and to display it on the user interface pages of the website building system; a UI director/changer to instruct the website building system UI server to move the user to a promotional page for the promotional package and a coordinator to instruct the individual digital communicator, the coupon creator, the banner creator and the UI director/changer according to instructions from the channel determiner.

Still further, in accordance with a preferred embodiment of the present invention, the individual digital communication channel is at least one of email, instant messaging and chat.

Additionally, in accordance with a preferred embodiment of the present invention, the page is at least one of an alternative home page and a landing page.

Moreover, in accordance with a preferred embodiment of the present invention, the website building system UI server includes a plan picker interface to receive instructions from the user regarding the promotional package.

There is provided, in accordance with a preferred embodiment of the present invention, a method for a website building system server, the server having at least one processor and a memory. The method includes constructing a promotional package for a user of the website building system according to at least editing history and/or business intelligence of a website belonging to the user; determining the best mode of interface to present the promotional package to the user and modifying the website building system interface for the user according to the best mode of interface.

Moreover, in accordance with a preferred embodiment of the present invention, the promotional package is based on user and website parameters and pre-defined plans and rules.

Further, in accordance with a preferred embodiment of the present invention, the promotional package is based on current session parameters for an anonymous user.

Still further, in accordance with a preferred embodiment of the present invention, the promotional package includes at least one of: a pre-defined plan, additional offers, third party applications and vertical solutions.

Additionally, in accordance with a preferred embodiment of the present invention, the promotional package includes least one of: a visual design and payment cycle information.

Moreover, in accordance with a preferred embodiment of the present invention, the pre-defined plan includes at least one of: features, limitations, plug-ins, advertisement behavior, domain connection information, templates and third party applications.

Further, in accordance with a preferred embodiment of the present invention, the best mode of interface is at least one of: via the website building system user interface and an individual digital communication channel.

Further, in accordance with a preferred embodiment of the present invention, the method includes storing the least editing history and/or business intelligence of the website belonging to the user; receiving edits to the pre-defined plans and rules from the vendor of the website building system; applying internal AB testing on at least one of: visual design, content and parameters of promotional packages provided by the website building system and displaying the promotional package to the user via the user interface of said website building system.

Still further, in accordance with a preferred embodiment of the present invention, the storing stores at least one of: the user and website parameters, vertical solutions, the pre-defined plans and rules, results of the internal A/B testing and results of marketing campaigns.

Additionally, in accordance with a preferred embodiment of the present invention, the constructing includes at least one of: configuring a baseline plan based on the user and website parameters; configuring a premium plan based on the at least editing history and/or business intelligence parameters; determining if there are current deals available as defined by a vendor of the website building system and determining if there are there are any current campaigns for the website as defined by a vendor of the website building system.

Moreover, in accordance with a preferred embodiment of the present invention, the constructing includes applying results of the internal A/B testing.

Further, in accordance with a preferred embodiment of the present invention, the constructing includes applying the rules and plans based on the user and website parameters and the at least editing history and/or business intelligence parameters; creating the promotional package based on the results of the configuring a baseline plan, the configuring a premium plan, the determining if there are current deals, the applying results of the internal A/B testing and the applying the rules and plans together with visual design information and coordinating between the configuring a baseline plan, the configuring a premium plan, the determining if there are current deals, the applying results of the internal A/B testing and the applying the rules and plans and the at least one database.

Still further, in accordance with a preferred embodiment of the present invention, the applying the rules and plans includes at least one of analyzing at least to extract at least one pre-defined plan according to the pre-defined rules and where the analyzing performs a deep analysis of vertical solutions and third party applications associated with the at least one pre-defined plan and adapting the pre-defined rules according to analysis of the user and website parameters, the at least editing history and/or business intelligence parameters, associated vertical solutions and associated third party applications and where the analyzing at least to extract at least one pre-defined plan and the adapting the pre-defined rules, analyzes results of the internal A/B testing and results of marketing campaigns.

Additionally, in accordance with a preferred embodiment of the present invention, the adapting the pre-defined rules includes internal A/B testing of pricing schemes according to an external cause.

Moreover, in accordance with a preferred embodiment of the present invention, the external cause is at least one of: currency rate fluctuations and competitor pricing.

Further, in accordance with a preferred embodiment of the present invention, the receiving edits includes creating and maintaining a multidimensional matrix of promotional packages and plans and other data structures based on the user and website parameters and the at least editing history and/or business intelligence parameters, receiving edits to the pre-defined rules and plans from a vendor of the website building system; and creating a visual layout to present the promotional package to the user.

Still further, in accordance with a preferred embodiment of the present invention, the creating a visual layout is based on a page visual editor of the website building system.

Additionally, in accordance with a preferred embodiment of the present invention, the modifying the web site building system includes at least one of: informing the user of the promotional package via an individual digital communication channel; creating a coupon for the promotional package and displaying it on the user interface pages of the website building system; creating a banner for the promotional package and displaying it on the user interface pages of the website building system; instructing the website building system UI server to move the user to a promotional page for the promotional package and coordinating the informing said user of the promotional package, the creating a coupon, the creating a banner and the instructing the web site building system UI server, according to the results of the determining the best mode of interface.

Moreover, in accordance with a preferred embodiment of the present invention the informing the user is via at least one of: email, instant messaging and chat.

Further, in accordance with a preferred embodiment of the present invention, the page is at least one of an alternative home page and a landing page.

Still further, in accordance with a preferred embodiment of the present invention, the displaying the promotional package to the user includes receiving instructions from the user regarding the promotional package.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 7 is a schematic illustration of a 2-dimensional matrix of plans as presented by the offering editor server of FIG. 1, constructed and operative in accordance with a preferred embodiment of the present invention;

FIGS. 9A and 9B are schematic illustrations of the presentation of an offering to a user via the UI server of FIG. 1, constructed and operative in accordance with a preferred embodiment of the present invention.

Figure 1:
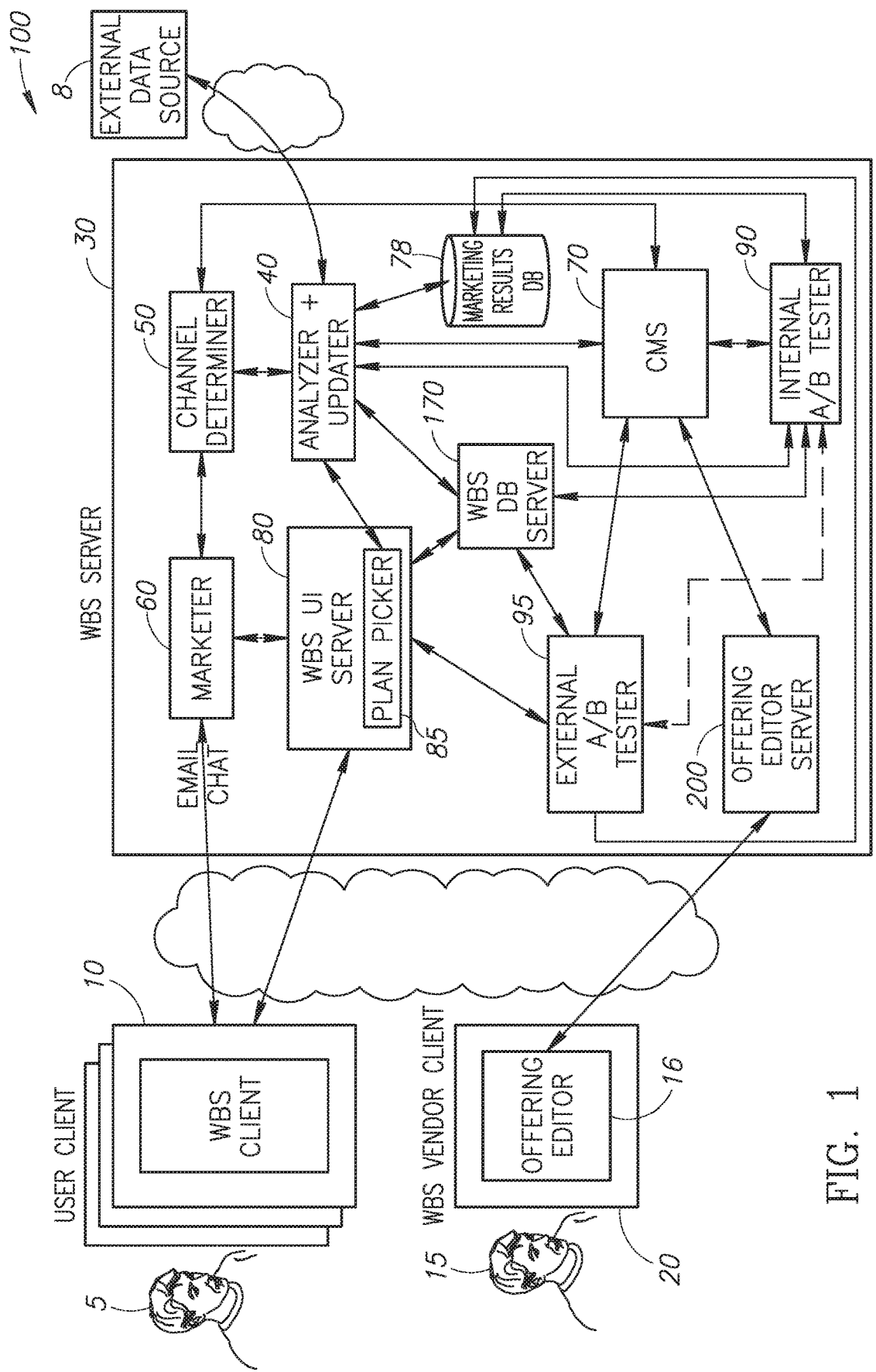
FIG. 1 is a schematic illustration of a system for creating and promoting an offering for a website building system; constructed and operative in accordance with a preferred embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicants have realized that current predefined packages or offerings may be very standard and rigid and may not exactly meet the actual requirements of the user. Furthermore, since the packages are typically configured by the website building system vendor at a manual level, it is almost impossible to meet the needs of each individual user and in particular each user using a website building system serving millions of users spread over multiple geographies, industries and levels of expertise.

Applicants have further realized that these offerings may be part of a marketing campaign or may be tailor made for each website building system subscriber via an offering system based on an analysis of user data and web site data as well as data gleaned from the editing history of the website and any business intelligence information based on the industry related to the website, geographical location of the user etc. as described in more detail herein below. The offerings could also be based on the results of marketing campaigns and market research by the website building system vendor using evidence-based techniques such as AB testing. This gathered information may be used to generate the best combination of general-use and solution-specific premium capabilities and may also determine the optimal channel of communication for presenting the offering to the user. These channels may include but not be limited to emails, social media and modification of the user interface displayed by the website building system to the user.

As discussed herein above, these offerings or marketed goods may include packages based on user and other parameters including both regular and premium packages as well as other deals and coupons.

It will be appreciated that these marketed goods may be offered to a user through both internal and external marketing and may not be unique to a particular form of marketing (such as banners).

Internal marketing may be specific to the particular website building system in use, may be based on internal elements and may be integral to the user interface or may be an add-on to the user interface (such as an added banner). It also may include direct communication with the user (such as via email, chat, the account interface of the user or a dashboard package).

External marketing schemes may begin outside the pertinent website building system and may include search engine promotions which lead to a landing page, web promotions and banners in other sites (such as Facebook or others) or via other promotions such as off-line advertising and QR codes (pointing at a landing page which includes a plan picker user interface).

An offering typically consists of multiple plans (premium packages), additional components (such as vertical solutions, third party applications etc.) or a combination thereof. Each single plan may include multiple product features, limitations and capabilities.

An offering may also include multiple payment cycles (monthly, yearly) which may be applied to various plans and elements. Thus, an offering can be viewed as a matrix in which each offered plan or element is a column and each payment cycle is a row (as discussed in more detail herein below).

The offering system may include a repository CMS (Content Management System) of offerings and plans, which may be edited by the website building system's vendor personnel through a special-purpose editor. The CMS may include complete offerings, specific plans or other offering elements. The CMS may also include full or partial visual information for specific elements (including visual design and layout information), e.g. "display this high-bandwidth plan in red with an enclosing yellow rectangle".

The displayed offering may change from time to time—even during a single work session. This happens since the displayed offering may depend (for example) on the user's actions (e.g. how many times the user has published his site) or even the "system age" of the user—how much time has passed since the user registered in the system?

As discussed herein above, a typical offering may include a vertical solution (a dedicated website building system based site or application offered to a specific segment of site owners), premium packages, plug-in components from a third party application, special payment cycles etc. as discussed in more detail herein below.

It will be appreciated that a website building system may be a standalone system, or may be embedded inside a larger editing system. It may also be on-line (i.e. applications are edited and stored on a server), off-line or partially on-line (with web sites being edited locally but uploaded to a central server). On-line website building system vendors typically include a site hosting package as part of their offering, with site users accessing a hosting server managed by the website building system vendor.

Website building systems allow their users to create sites which include applications. A visually designed application may consist of pages, containers and components. Pages may be separately displayed and contain components. Components may be arranged in a hierarchy of containers (single page and multi-page) inside the page containing atomic components. A multi-page container may display multiple mini-pages.

Components typically have attributes (e.g. size, position, color, frame type, etc.) as well as content (e.g. contained text in a text component).

Pages may also use templates—general page templates or component templates. Specific cases for templates include the use of an application master page containing components replicated in all other regular pages, and the use of application headers/footers (which repeat on all pages). The website building system may also provide full site templates which provide a template for an entire site (typically including multiple pages).

The arrangement of components inside a page is called layout.

Pages may also include various plug-in components which may be provided or hosted by the website building system vendor itself (such as list applications as described in US Patent Publication No. US 2014-0282218 A1, published 18 Sep. 2014 and assigned to the common assignee of the present invention) or by third party providers (third party applications). Some of these plug-in components may be simple (e.g. a Facebook like button) and some may be complex (e.g. a complete e-Shop plug-in).

Such plug-in components may require a multi-step setup procedure. For example, the setup of an e-Shop component may include a sub-element design (product page, shopping cart options), merchant ID setup, product definition database creation, delivery option definition etc.

As discussed herein above, components may have internal content. In the case of plug-in components, such content may be substantial—for the e-Shop example, the content may be an entire shop inventory definition. Furthermore, for third party applications, such content may be stored on external servers not managed by the website building system vendor.

The website building system may also offer vertical solutions as discussed herein above. A vertical solution is a dedicated website building system-based site/application offered to a specific segment of site owners (such as hotel owners, restaurant owners, e-Shop owners or a performing band) and adapted to its requirements.

The vertical solution may include templates (page templates or full site templates), specific vertical-oriented plug-in components (such as ordering system interface plug-in for a restaurant vertical solution) as well as additional system features and customizations. It will be appreciated that any vertical solution user can install such a vertical solution on his site and use the vertical solution for his purposes. It will also be appreciated that vertical solutions are typically a premium capability; therefore its users are typically those that have paid for some form of premium package.

A vertical solution may be constructed in such a way that only one vertical solution may be installed on the user's site. Alternatively, some vertical solutions may be constructed in such a way that they could be installed next to other vertical solutions in a single site (e.g. a single site serving a hotel which also includes a restaurant open to the public).

Reference is now made to FIG. 1 which illustrates an offering system 100 for creating and promoting an offering or package for a website building system according to an embodiment of the present invention.

Offering system 100 may comprise a user client 10, a vendor client 20 and a website building system server 30. A user 5 may work on user client 10 to build his website. A website building system vendor 15 may use vendor client 20 and vendor offering editor 16 to update and modify rules concerning the creation of packages as described in more detail herein below. System 100 may also receive data from an external data source 8 as described in more detail herein below.

It will be appreciated that the embodiment of FIG. 1 described here in below discusses an implementation in which most of the functionality of system 100 occurs on website building system server 30. In alternative embodiments, some or all of functionality of system 100 may occur on user client 10 and/or vendor client 20 or may be equally divided between website building system server 30 and user client 10 and/or vendor client 20. In another embodiment, system 100 may be implemented as a local product on user client 10 or even a mobile device. In some of these embodiments the website building system may still provide a website building system server 30, but it may only include back-end database access and similar functions.

WBS Server 30 may further comprise an analyzer and updater 40, a channel determiner 50, a marketer 60, a WBS database server 170, a content management system 70 and a marketing result database 78. Server 30 may also comprise a website building system UI server 80, an internal A/B tester 90, an external A/B tester 95 and an offering editor server 200.

Figure 2A:
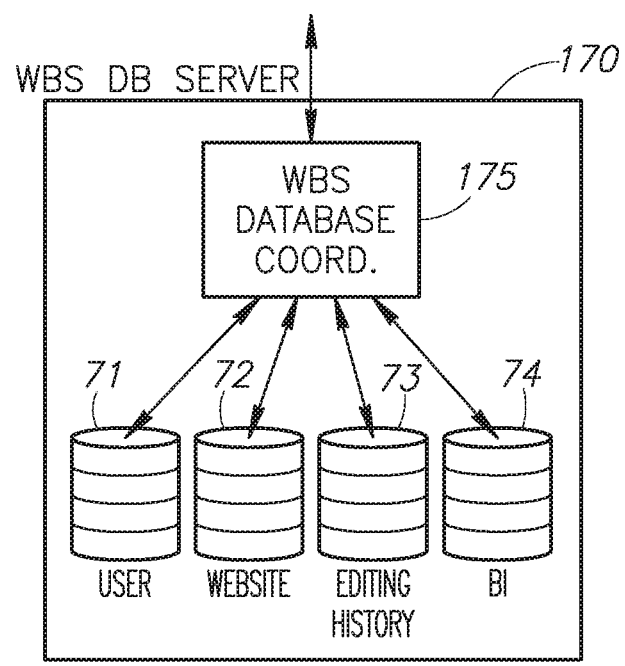
FIG. 2A is a schematic illustration of the elements of the WBS database server of FIG. 1, constructed and operative in accordance with a preferred embodiment of the present invention.

Reference is now made to FIG. 2A which illustrates the elements of WBS database server 170. WBS database server 170 may comprise a WBS database coordinator 175 to coordinate between a user database 71, a website database 72, an editing history database 73 and a Business Intelligence (BI) database 74.

Figure 2B:
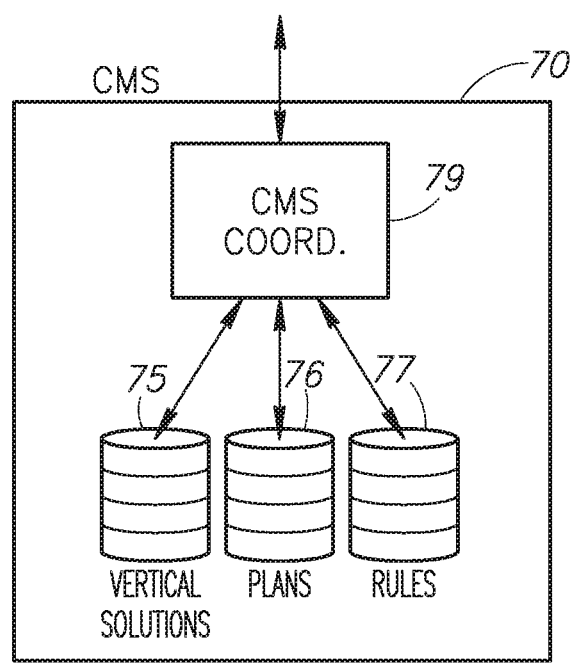
FIG. 2B is a schematic illustration of the elements of the content management system of FIG. 1, constructed and operative in accordance with a preferred embodiment of the present invention.

Reference is now made to FIG. 2B which illustrates the elements of CMS 70 which may further include a CMS coordinator 79, a vertical solutions database 75, a rules database 77 and a plan repository database 76.

It will be appreciated that in an alternative embodiment, databases 71-78 may be implemented within a single database with a logical partition, or as a set of databases which are arranged in a different manner (e.g. per geography). It should be further noted that databases 71-78 may vastly differ in their size and update frequency. In particular, user database 71, website database 72, editing history database 73, BI analysis database 74 and marketing results database 78 may (for example) contain many millions of elements and be updated very frequently whereas vertical solutions database 75, rules database 77 and plan repository database 76 may be much smaller and infrequently updated.

Figure 2C:
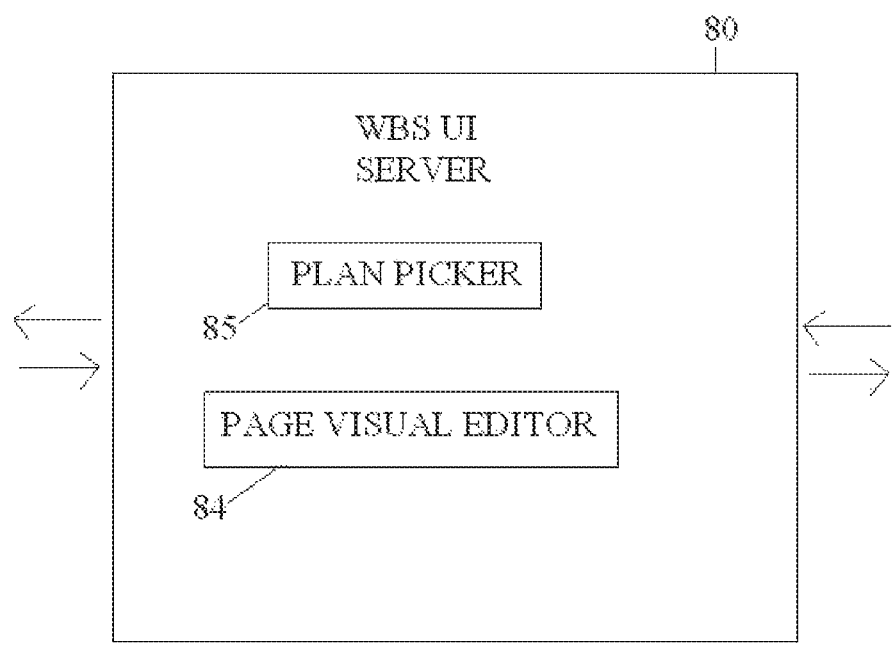
FIG. 2C is a schematic illustration of the elements of the WBS UI server of FIG. 1, constructed and operative in accordance with a preferred embodiment of the present invention.

Reference is now made to FIG. 2C which illustrates the elements of website building system UI server 80. Website building system UI server 80 may further comprise a page visual editor 84 and a plan picker 85, the functionality of which is discussed in more detail herein below.

Analyzer and updater 40 may create a final offering or a set of possible plans which may also be based on a complete offering, a partial offering or single plans (stored within CMS 70). The final offering may include base plans, premium plans, deals and coupons as described in more detail herein below. Analyzer and updater 40 may also filter the available offerings (complete or partial) to remove any offering (and possibly plans) which are not relevant to the current user and may also rank the offerings in order to select a single best final offering. It may also handle feedback and updates from the user regarding plan selections together with the results of marketing and AB testing to be used in future offering/plan generation.

Channel determiner 50 may determine in which ways the offering should be conveyed to the user (including inserting into the UI of the website building system as well as direct communication with the user such as email). It will be appreciated that channel determiner 50 may handle internal marketing (as described herein above). External marketing may be handled separately i.e. a marketing person may initiate a banner ad campaign (to Facebook or other channels) or an e-mail blast campaign which is sent to many users and points them to a given landing page that includes a given package or offering as described in US Patent Publication US 2016/0124839 titled "SYSTEM AND METHOD OF HANDLING COMPLEX EXPERIMENTS IN A DISTRIBUTED SYSTEM" published May 5, 2016 and assigned to the common assignee of the present invention.

Marketer 60 may convey the determined offering to user 5 as determined by channel determiner 50—either directly (e.g. through e-mail/chat) or by instructing WBS UI server 80 on the specific UI elements or changes to display as described in more detail herein below.

CMS 70 may store in its various databases both complete and partial offerings, single plans and related elements. CMS 70 may also include full or partial visual information for specific elements. It also may include deals (specific promotions which are typically time-limited) and coupons (specific promotions which are "consumed" when used). These parameters are taken into account by analyzer and updater 40 when generating a final offering as described in more detail herein below.

WBS UI server 80 may provide the user interface of the website building system to user 5 and may further comprise a page visual editor 84 and a plan picker 85. Page visual editor 84 may receive instructions from user 5 regarding the design of his website. Plan picker 85 may act as an interface to present the final offering to user 5 and to receive feedback from user 5 regarding his selected plan and payment cycle as described in more detail herein below.

Internal A/B tester 90 may apply A/B testing inside the offering generation process (e.g. offer a given package for $10 or $12 per month). This process may typically occur before the actual UI generation, although it could affect the UI generation directly (i.e. display special premium package X in bold or not).

External A/B tester 95 may apply A/B testing to the UI of the website building system as well as other external campaigns and to the landing pages to which they point which typically (but not always) may lead to specific packages or offerings. The results of these tests may be stored in marketing results database 78 together with the results of marketing campaigns.

Offering editor server 200 may allow vendor 15 and his personnel to edit the content and visual presentation of the offerings and plans held in CMS 70 via vendor offering editor 16.

Figure 3:
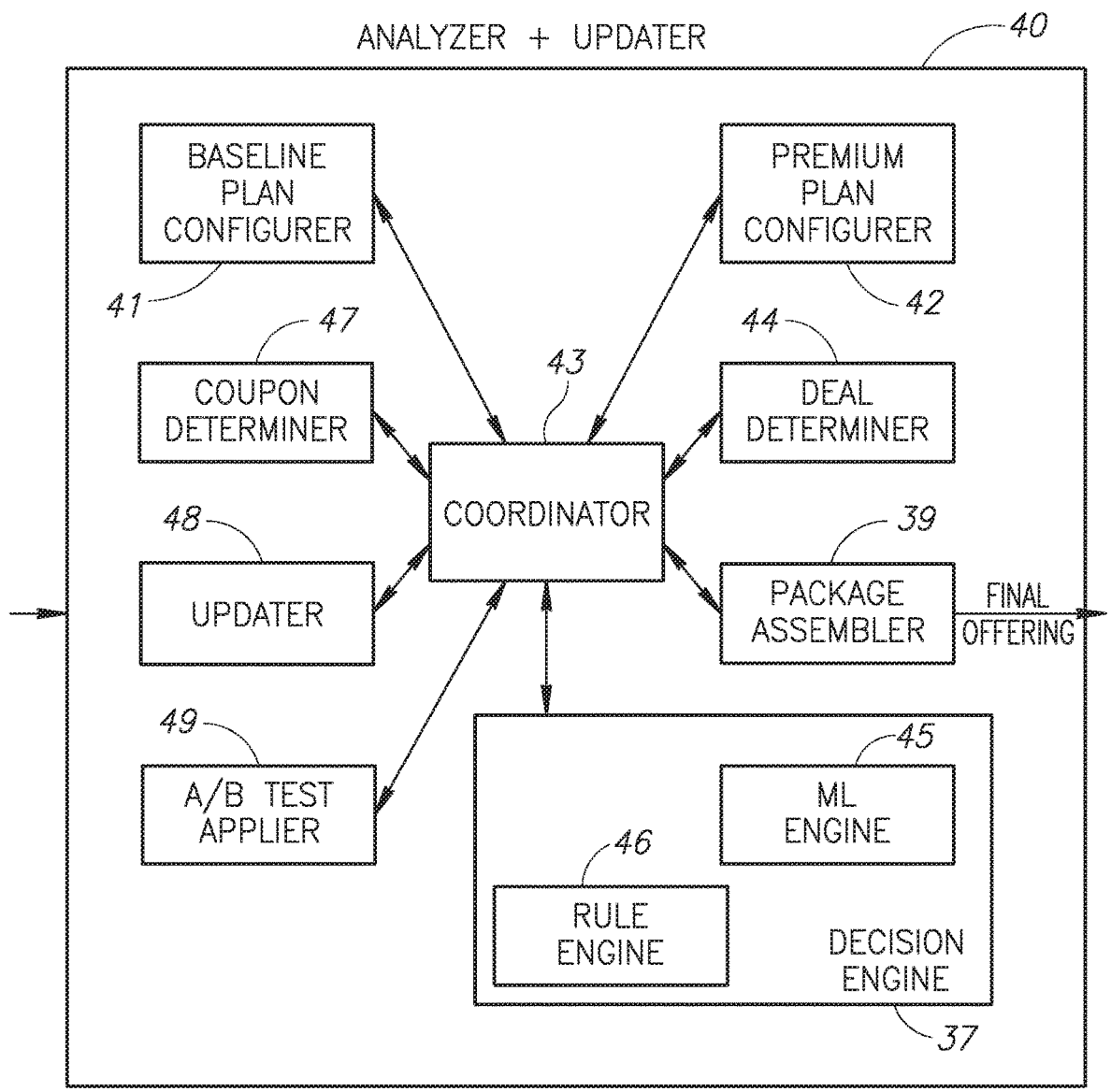
FIG. 3 is a schematic illustration of the elements of the analyzer and updater of FIG. 1, constructed and operative in accordance with a preferred embodiment of the present invention.

Reference is now made to FIG. 3 which illustrates the elements of analyzer and updater 40. Analyzer and updater 40 may comprise a baseline plan configurer 41, a premium plan configurer 42, a coordinator 43, a deal determiner 44, a decision engine 37, a coupon determiner 47, an updater 48, an A/B test applier 49 and a package assembler 39.

Decision engine 37 may further comprise a machine learning (ML) engine 45, a rule engine 46 as described in more detail herein below.

As discussed herein above, analyzer and updater 40 may generate a final offering to be presented to user 5. It will be appreciated that the generated offering may be for a brand new (possibly anonymous) user, an existing user which selects a package for the first time or upgrade for an existing user which already has an existing package. It will be appreciated that sources for offerings may come from an existing complete offering—predefined by vendor 15 and stored in CMS 70, a partial offering—predefined by vendor 15 and stored in CMS 70, but which allows additional components to be added to the partial offering definition or a combined offering which may be a combination of multiple separate plans defined in CMS 70 (e.g. according to decision engine 37).

Analyzer and updater 40 may work in real time, i.e. during the time that user 5 is logged into his website building system. As user 5 proceeds through his session, new offerings may be generated based on updated activity and the passage of time. Analyzer and updater 40 may generate the following components: basic plans, premium plans, additional offerings (verticals, features etc.) together with deals, coupons (consumable) as well as a visual layout for the resultant offering.

Baseline plan configurer 41 may configure a baseline set of capabilities or plans in a "basic"/"standard" package when user 5 first subscribes to the website building system which may be augmented or expanded by premium plan configurer 42, which may add premium packages at a later stage as described in more detail herein below. Baseline plan configurer 41 may configure a baseline offering based on an analysis of user parameters stored on user database 71 typically gathered during the registration process. It will be appreciated that the website building system may also allow anonymous users to create sites without registering. In this scenario, the user may provide only a username and password which does not provide any useful information. It will be further appreciated that offering system 100 may collect external details such as the location of the user and the client system type in order to determine some form of baseline capability offering for such anonymous users. It will also be appreciated that in this scenario, offering system 100 may only generate an offer based on current session parameters (unless system 100 is able to identify a returning anonymous user based on some user parameters).

Premium plan configurer 42 may configure a premium offering or plans based on additional capabilities after the site has been created (or during the creation of the site) using a broader analysis of parameters saved on sites database 72, editing history database 73 and BI analysis database 74.

Deal determiner 44 may determine if there are any relevant current deals as defined by vendor 15 and stored on CMS 70 that can be added to the generated offering.

Coupon determiner 47 may determine if there are any current campaigns as defined by vendor 15 and stored on CMS 70 which may typically be mini campaigns with limited use. The coupons may be specific registration/premium coupons, i.e. coupons provided by the website building system vendor and used by the user during registration, premium package purchase or on other occasions. Such coupons may be provided (for example) as part of a promotional campaign.

Updater 48 may receive and handle feedback on plan selections by user 5 and any A/B testing to be used in future offerings/plan generation and may update CMS 70 and/or databases 70-78 accordingly.

A/B test applier 49 may implement the A/B test results as provided by internal A/B tester 90 on the offerings to be delivered.

Decision engine 37 may apply the rules as stored on rules database 77 to make decisions for the other elements of analyzer and updater 40. Rule engine 46 may extract offerings from CMS 70 based on an analysis of databases 71-74 according to rules stored on rules database 77. It will be appreciated that rule engine 46 may be complimented by ML engine 45 which may also analyze parameters to adapt the rules accordingly. ML engine 45 may use a number of known techniques such as neural networks or genetic algorithms. It will be appreciated that in alternative embodiments, decision engine 37 may also comprise other decision making engines (using various machine learning or non-machine learning techniques).

It will also be appreciated that decision engine 37 may also determine according to pre-defined rules, which offering plan to use if more than one seems to be relevant based on the site structure. For example, if the site contains both hotels-related and e-Shop related elements, and the website building system provides offerings for both.

Package assembler 39 may combine all the different components generated by the other elements of analyzer and updater 40 and may also filter, match and rank the results in order to create the best case final offering.

Coordinator 43 may coordinate between the elements and databases 71-78.

It will be appreciated that an offering to a user may consist of a set of offered plans from which user 5 may select a plan to apply to his website. A plan definition may include the following: an underlying premium package, i.e. what are the technical parameters/features of the plan (such as hosting parameters (e.g. bandwidth), advertisement inclusion, domain connection, offered templates and plug-in etc.), a plan price, a payment scheme (e.g. monthly or yearly—known as "payment cycle"), a plan name (e.g. "yearly extended hosting plan"), possible additional meta-data and additional offers (such as coupons for Google advertising, Facebook advertising, 1 year free domain connection, 1 year use of one application from the application market of the website building system, etc.) A single premium package (i.e. set of hosting and other parameters) may be offered through multiple offerings (e.g. as part of a hotels-related offering and as part of a restaurant-related offering).

An offering definition may include: a set of underlying offered plans and a specific design for plan picker 85 (as described in more detail herein below). An offering may also include some form of visual design to be used by plan picker 85 (as discussed in more detail herein below).

It will be appreciated that the visual design of the offering may be described using visual design definitions. A visual design definition may be built (for example) using a visual rule language, or using a template format similar to the one used by the website building system itself to describe page structures. Visual design definitions are attached to elements (plans, offerings) stored in CMS 70, or may be retrieved via matching (e.g. for generated plans). It will be appreciated that visual design definitions may be per-column or per table and they may be created using a version of the regular website building system page visual editor.

A visual design definition may also affect other elements of the offering (not just the one the visual design definitions is associated with) or the entire offering. For example: the visual design definitions associated with a specific plan (column) may specify that other plans (columns) in the same offering would be grayed out or a specific plan may specify an ordering of the plan inside the offering.

It will also be appreciated that a single offering may have multiple generated layouts. There could be multiple visual layouts defined for each offering, possibly including different subsets of the information (e.g. specific plans only, or just part of the plan information for each plan). Such formats may include (for example) a full package picker table format and a number of banner-type UI inserts.

It will be appreciated that the different formats are aimed at different presentation methods inside WBS UI server 80 (as described in more detail below). Some formats may be very limited, e.g. show just the current topmost offer etc.

The offering generation process by analyzer and updater 40 (i.e. generation, filtering and selection) may thus generate a single final offering that has multiple display definitions.

Figure 4:
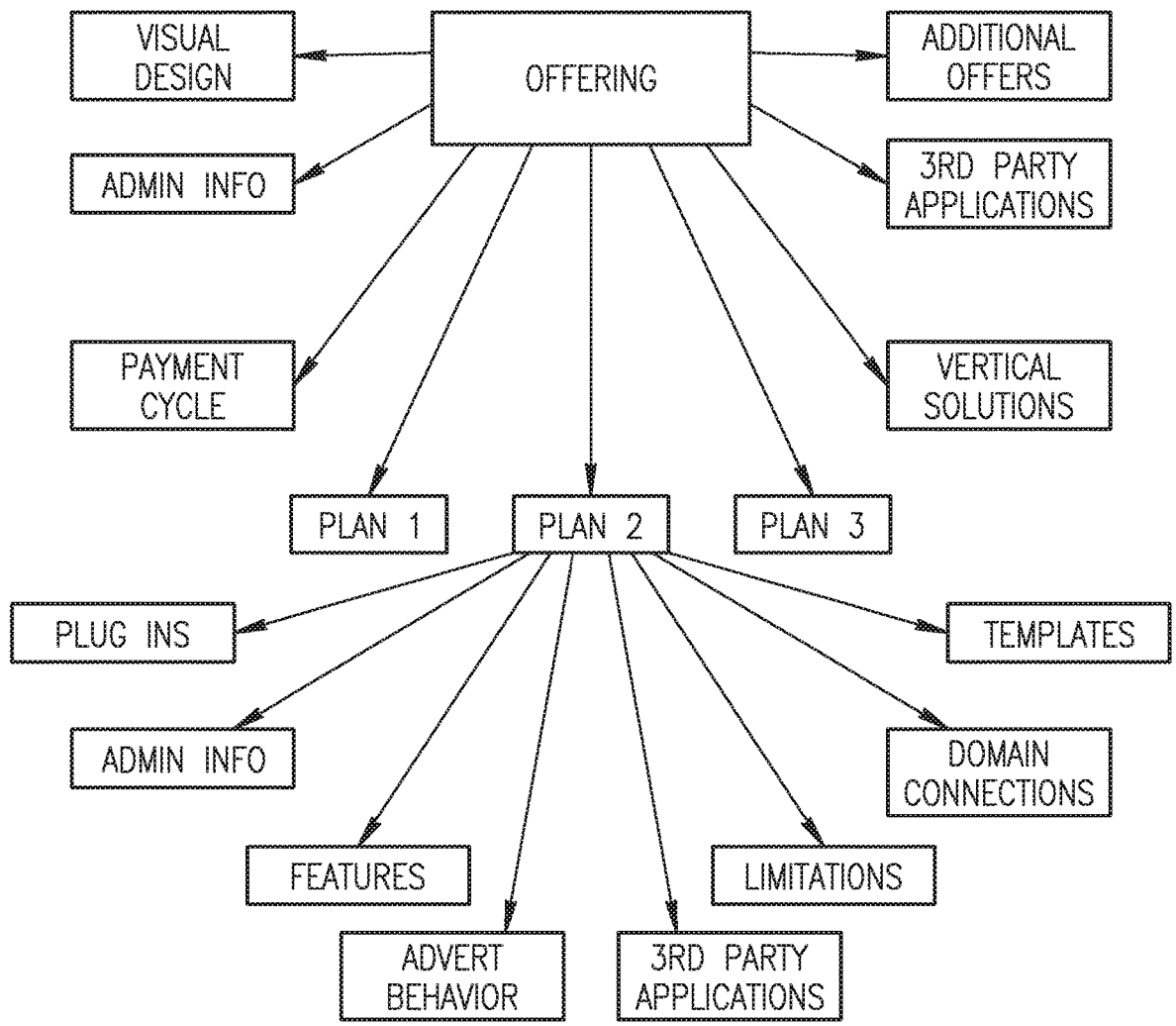
FIG. 4 is a schematic illustration of the components of an offering, constructed and operative in accordance with a preferred embodiment of the present invention.

Reference is now made to FIG. 4 which illustrates the data structure of a typical offering. As can be seen, each offering may include 4-5 plans as well as a visual design (for plan picker 85 to use as described in more detail herein below), administration information (offering name, offering meta data), payment cycle details, additional offers such as coupons, related third party applications and vertical solutions.

Each plan may have its own administrative information (plan name and plan meta-data) as well other information regarding product features, limitations (such as bandwidth and storage), advertisement behavior, domain connection, templates, plug-ins and third party applications.

A baseline offering may include (for example) any combination of the following capabilities: a specific set of components including plug-in components, a specific set of templates, a specific hosting package, including (for example) specific limitations on storage, CPU and bandwidth use, specific media file support configuration (e.g. support for specific media formats, media file size and video playback length), specific advertising behavior (e.g. a free basic package would allocate specific screen space for advertising display or specific time periods for advertising playback) and domain name handling, e.g. can user 5 connect a domain to the website building system-hosted site, and what types of domains are available.

The baseline offering may also offer additional capabilities (or relaxation of limitations) which may include (for example): additional components types (regular and plug-in), additional capabilities for existing components and additional templates. It may also include changes to the media support parameters (e.g. allowing larger or unlimited video file sizes), changes to the hosting parameters of the system (i.e. higher bandwidth or storage) and changes to system behavior (not related to specific components). For example, a system may use an ad-supported business model, in which a user may sign up for a subscription plan which provides an ad-free service.

Other baseline offerings may include vertical solution-specific capabilities, such as the maximal number of categories or products in an e-Shop vertical solution and changes to domain connection options.

Such added capabilities may be offered: through options in the regular system user interface (e.g. menus etc.), through options added dynamically to the regular system user interface or through an AppStore (integrated into the product or external). Such added capabilities may be free (e.g. require just an appropriate registration) or may require payment. It will be appreciated that offerings may also be made to users via external channels such as marketing campaigns as discussed herein above.

Premium plan configurer 42 may configure various premium packages which combine any of the additional capabilities (as described herein above). Such packages may be general-purpose, or aimed at specific vertical market users of the website building system.

It will be appreciated that a typical implementation may offer capabilities defined at the site level. However, it should be noted that offering system 100 may offer capabilities at multiple levels. For example, offering system 100 may offer sets of capabilities at the site level, at the user level (with a single user allowed to create multiple sites) or at a user group level (e.g. a system allowing multiple user accounts which belong to a single group managed together). Thus, offering system 100 may define a specific capability or limitation (e.g. hosting storage limitations) which has different value for each of the levels.

A discussed herein above, baseline plan configurer 41 may configure the baseline plans according to user parameters. Baseline plan configurer 41 may employ decision engine 37 to analyze the main user parameters according to pre-defined rules or to gather user responses to previous offering proposals. These rules may be stored on rule database 77 and may be pre-defined by vendor 15 via offering editor server 200 and vendor client 20. As discussed herein above, the main user parameters may include information about the user which can be determined before the user has created any website.

The main user parameters may include but may not be limited to the geographical location of the user (e.g. as determined by the IP of the transmitted location), the system language selected by the user, the source of the user—e.g. did the user arrive directly at the website building system or through a specific distribution channel, marketing campaigns, from a specific organization (e.g. for rules such as "provide extended storage of x to registering users from company y"), a referrer site, a specific promotion etc. Other main user parameters may include search keywords, i.e. baseline plan configurer 41 may receive the search keywords used by the user when searching for the website building system vendor site using a search engine.

Further parameters may include the business type of the user (the website building system may allow the user to pre-specify a business type), the user selected vertical solution (hotels, e-Shop, restaurants etc.)—if pre-selected during the registration process, the client version of the system (for website building systems which provide multiple preinstalled client software versions), the system profile of the user (e.g. providing different baseline packages to mobile users vs. PC users), the "system age" of the user (how much time passed since the user has registered with the system) and user data from a site settings, description or post-registration dialog. In particular, offering system 100 may present such dialogs (e.g. after the user has completed the registration procedure) and receive information from the user about the purpose of the site, its vertical classification etc.—before the site was created. This information can be later compared to the actual site, so to better understand any intentions of the user.

In an alternative embodiment, baseline plan configurer 41 may also configure a baseline offering which would be useable for additional sites made (for example) by the same user. In this scenario, baseline plan configurer 41 may also consider information extracted from previous sites made by the same user.

It will be appreciated that website building system vendor 15 would like to offer the most relevant added capabilities to the user based on his actual interests and relevancy. This is particularly important when trying to determine which vertical system package to offer—as such packages tend to include high-end functionality and provide higher revenue to website building system vendor 15.

In an alternative embodiment to the present invention, a limited implementation of offering system 100 may be created which does not include baseline plan configurer 41. In such an implementation, offering system 100 may initially provide a fixed set of capabilities for each site without evaluating the main user parameters. Offering system 100 may only later operate premium plan configurer 42 when a site upgrade is desired (as discussed in more detail herein below).

As discussed herein above, premium plan configurer 42 may determine what premium packages and vertical packages to offer. It will be appreciated that the interests and focus of the user may be determined using an analysis according to rules held in CMS 70. However, a simple analysis (based just on the included components) may provide ambiguous results. For example, user 5 may have installed multiple plug-in components that are related to different vertical solution offerings. For example, a museum web site may include both a museum-oriented image galleries plug-in (to display artwork from the museum) and e-Shop plug-in (used for the museum's souvenir and merchandise store).

To resolve this, premium plan configurer 42 may use rules which determine the best capabilities to offer based on an analysis of the information about the user (the main user parameters described herein above) as well as information about the site being edited—the main site parameters. The main site parameters may include but are not limited to: the actual components used on the site, the internal content of the components—including indication as to the amount of data entered into components containing substantial data (e.g. amount of entries in blog components, number of items for sale in e-Shop component etc.) and the activation/setup level of complex components, plug-ins and included applications. For example, an e-Shop component may require multiple stages of setup. The more stages user 5 has executed, the more likely that the specific complex component is the one dictating the "nature" of the web site. Such information may be expressed as a multi-state status (demo, active, deleted) or a numerical value (e.g. number of installation steps completed, or a percentage-version thereof).

Other main site parameters may include previous selection/purchase of added capabilities, selection of templates for use in the site, the editing history of the site (e.g. time spent in the editor), the end-users usage history of the site, any additional data gathered by the BI sub-system of the website building system and any site setting/post saving/publishing dialog in which user 5 may provide additional site information (similar to the post-registration dialog described above, but performed after site creation). As discussed herein above, these parameters may be stored in databases 70-74 accordingly or may be created by analyzing the relevant sections of databases 70-74.

It will be appreciated that the editing history and end-user usage information may be collected by the website building system as part of standard BI collection, and may be stored for the specific site. Usage information for third party applications may be collected by the third party application provider and premium plan configurer 42 may need to request this information from the third party server (at least in summarized form). Alternatively this information may be obtained by a BI collection module which may collect information for the website building system in general and may also interact with third party application providers to get the required usage data.

As discussed herein above baseline plan configurer 41, premium plan configurer 42, deal determiner 44 and coupon determiner 47 may all use pre-defined rules held in rules database 77 which may be handled by decision engine 37.

Rule engine 46 may offer standard/premium packages, deals and coupons based on a deep analysis of parameters such as associated vertical solutions, associated third party applications, geographical location, language, packages installed in site; the age of the user in the system and the origin of the user (how he arrived in the system—paid/unpaid, via Facebook, via Google search etc.). It may also analyze whether the user used the various system-provided services (e.g. ordered a mailbox or a connected domain) as well as collected BI information on the user, e.g. "has the user published his site 5 or more times".

It will be appreciated that BI information may include information about the user's use of the website building system as well as information about the use of the end-users of the website itself and of related website building system services exposed to them (while using the website). It may also include information about attempted system use which did not materialize (e.g. the user has begun purchasing a premium package a few times but did not complete the transaction). BI information may also include information which can be otherwise extracted or derived about user 5 from other relevant internal or external sources.

Rule engine 46 may also distinguish between users who arrived directly to the website building system or whether they arrived through vendor-specific sources (such as specific partnerships and cooperation). Such sources can provide a "user color" which can be used for further analysis.

ML engine 45 may learn from the results of previous marketing campaigns (internal/external) as well as A/B testing results (as described in more detail herein below). Such learning may be fully automatic; human supervised (with a vendor 15 employee overseeing the process and approving tests and conclusions) or may be a combination of the two.

ML engine 45 may also refine the set of rules used to generate the final offering conveyed to the user (as described in more detail herein below), including possibly generating A/B tests for internal A/B tester 90. Such generated A/B tests may be implemented automatically or subject to full or partial human approval (as discussed herein above). The results of these A/B tests may then be further used to provide training for ML engine 45.

It will be appreciated that the created offerings may cover "what is offered" as well as the prices being set and may be subject to a set of rules which may control the suggested offering as well as the possible variations. Such rules may be standalone (e.g. "never allow a monthly package to be below $5/month") or may involve multiple elements (e.g. "if offering a basic e-commerce enabled plan, always offer a matching high-end full e-shop plan as well"). Such rules may represent the collected vendor 15 knowledge of "what components work best together" or "what pricing ranges work best in which market".

It will be appreciated that decision engine 37 (and ML engine 45 in particular) may also take into account external data from external data source 8 which may affect the decisions made. Such external data could be general in nature (e.g. currency rates, weather, stock/commodities market indices etc.) or specific extracted data (e.g. data extracted from specific websites or other data feeds, including these of competing, complementary or other relevant vendors).

One highly relevant case is the adjustment of prices in offerings due to currency exchange rate fluctuations or competitor pricing. Vendor 15 may be providing services to multiple countries with offerings made in multiple local currencies. Such local currencies may be subject to wild exchange rate fluctuations. ML engine 45 may respond to such fluctuations (e.g. when they exceed a given predefined threshold) by instructing internal A/B tester 90 to test user reactions to possible price variations. ML engine 45 may further implement the results of such generated tests if they have sufficient statistical significance. Such a process may be fully automatic, human supervised (by the vendor 15 employees familiar with the specific target markets) or semi-automatic (e.g. requiring human approval only above specific price variation or below a given statistical significance level). Such automatic testing and adjustment may respond more quickly than a human managing the process, and may allow price adjustments to be made even for relatively small rate changes.

It will also be appreciated that the use of ML engine 45 may depend on having a sufficiently large base of users, so that the results (of marketing campaigns and A/B tests) are statistically meaningful and based on a sufficiently large sample size. In an alternative embodiment, decision engine 37 may comprise of only one of rule engine 46 and ML engine 45 or may comprise or a single engine which provides both functions.

It will be appreciated that a rule may include a conditional expression based on the data included in the main user parameters and/or the main site parameters (e.g. "[user age >3 days] and ([user geo in Europe] or [Apps installed include 'Hotels-special'])"). Each of the specific conditional expressions may be referred to as a "rule element". A typical implementation may be limited to rules consisting of elements joined by the "and" operator only.

It will be appreciated that a rule may be associated with a specific offering. Rules may be fully matched (i.e. all elements are matched) or partially matched (i.e. match was found for only some of the elements). For example, if user 5 has both a hotel and an e-Shop application installed and used, decision engine 37 may look at the rule base to find a match for this combination.

If decision engine 37 locates a rule which provides a full match, it may use the offering included in the "hotel & e-Shop offering" matrix cell for the main user parameter values as held in CMS 70 which describe user 5 (for example "US/English/Source-A").

If decision engine 37 locates a partial match (in the example, locating two available offerings—e-Shop offering and different hotel offering), decision engine 37 may determine which one to use based on an offering rule priority parameter.

It will be appreciated that rule priorities may be determined as follows:

A full match will always have the highest priority.

Among partial matches, decision engine 37 may determine the priority according to the number of rule elements successfully matched. For example, when matching a site that has both hotels and e-Store application against the following rules, the ("stronger") $2^{nd}$ rule would be used:

| Rule # | Rule | Associated offerings |
|---|---|---|
| 1 | user age = 1-3 days & Apps installed = hotel | offer 1 |
| 2 | user age = 1-3 days & Apps installed = hotel & e-Shop | offer 2 |

In case of partial matches with similar number of matches, decision engine 37 may determine the priority according to a predefined per-rule priority field (if the website building system includes such a field).

Alternatively, decision engine 37 may use a more complex rule grading algorithm—such as attaching weights to some or all of the rule elements, main user parameter fields and main site parameter fields and combine these weights in a weighted average calculation to determine the best rule to use.

Figure 5A:
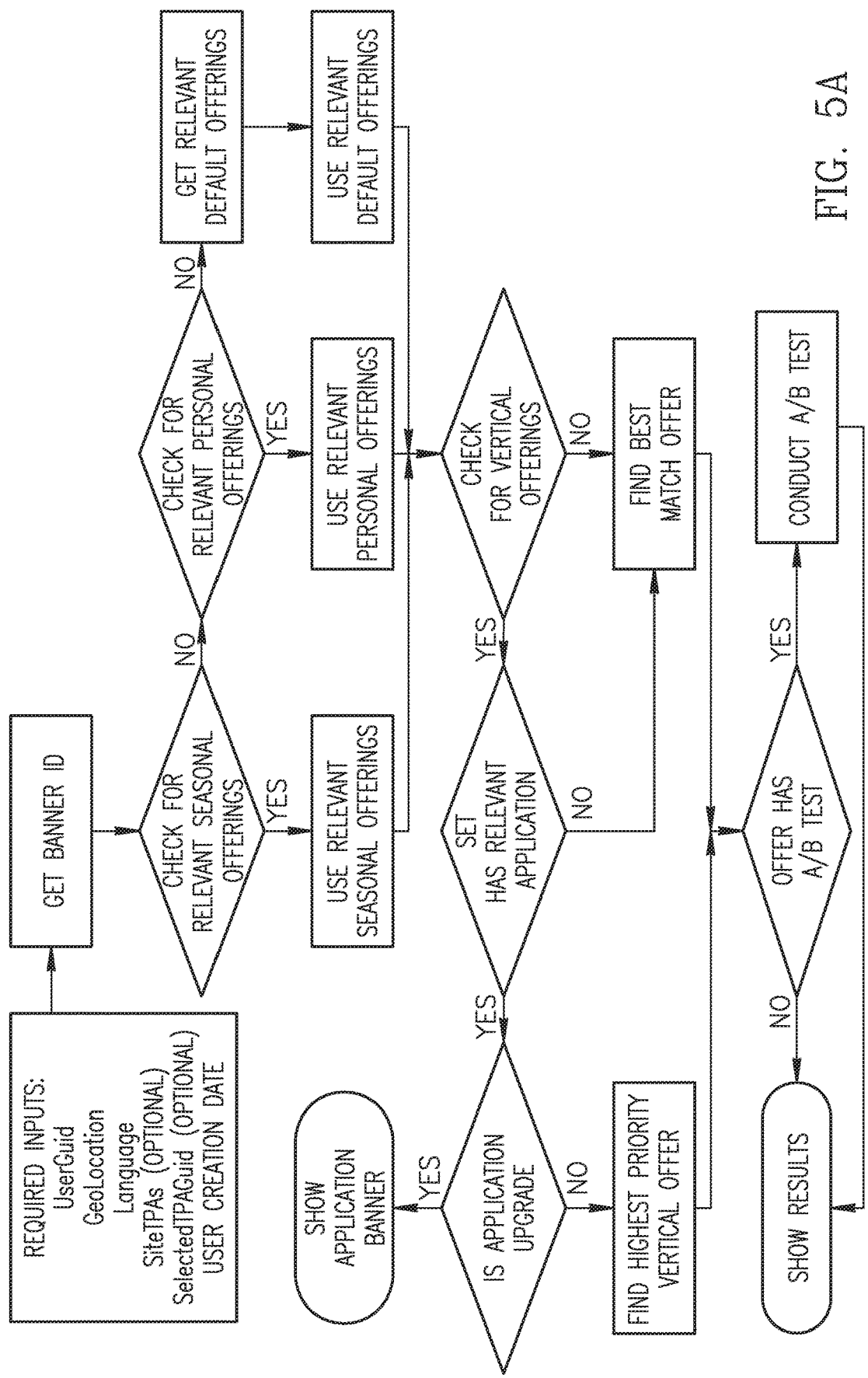
FIGS. 5A and 5B are flowcharts of example rules for the system of FIG. 1, constructed and operative in accordance with a preferred embodiment of the present invention.
Figure 5B:
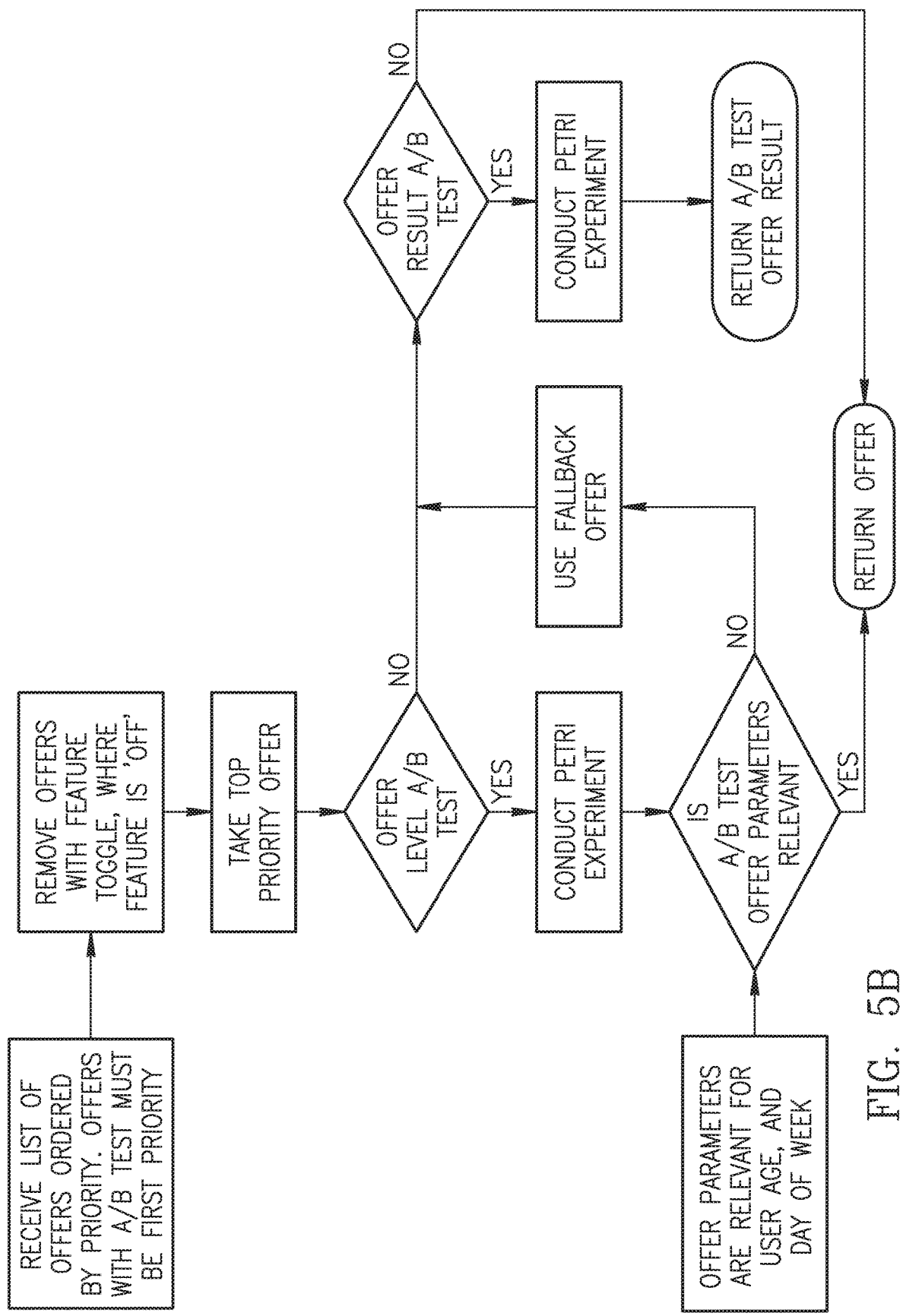

Reference is now made to FIGS. 5A and 5B which illustrate flowcharts of example rule sets which may be used by the elements of analyzer and updater 40 to determine the ultimate offering for user 5. FIG. 5A shows flowchart implementing a rule set for filtering an offering which may be used by decision engine 37 and FIG. 5B shows a flowchart implementing a rule set which supports applying AB testing into an offering selection. The "Petri" system mentioned in FIG. 5B may include an internal experiment management system used by system 100.

Premium plan configurer 42 may use the results from decision engine 37 to determine the most likely added capabilities and packages to offer.

It will be appreciated that premium plan configurer 42 may also configure an offering when the user asks for an upgrade to the site, and the premium offering is generated when the user makes the upgrade request (and not in advance). This is required as the offering may (for example) depend on the "age" of the user in the system which changes over time.

Offering system 100 may also offer upgrades (and capabilities) at the user level—even when the user has multiple sites, and when the analysis of each of the sites may yield different recommendations and offerings. In such a case, offering system 100 may offer a generic set of capability packages, based in general on the scope of system use of the user, may perform an analysis combining the multiple sites of the user as though they were parts of a single "virtual site", and use the resulting offering for that combined virtual site or may perform the analysis on each of the users and create a combined offering, listing the best offered packages for each of user's sites.

It will be appreciated that the pertinent website building system may also include a billing sub-system to provide: definition and management of plans, association of price plans and pricing information with the plans, VAT handling (based—for example—on country, payment method and credit card type and issuer) and currency handling (including prices in all supported currencies).

The website building system may also support alternate methods in which the information above is organized, e.g. associating coupons with top-level offering instead of a single offered plan as discussed in more detail herein below.

It will be appreciated that offering system 100 may operate on-line while user 5 is working on the website building system and may be invoked when needed to display an offering. This could be (for example) in a designated display area (plan picker 85) or in other area in the WBS UI server 80 as described in more detail herein below.

Updater 48 may also determine how to handle the interaction of an application upgrade. It will be appreciated that an upgrade may include changes to the site itself such as additions and removals of such as vertical-specific third-party applications. Some of the relevant cases (and possible ways to resolve them) may include the user removing or adding an application after the site is upgraded with a specific offering. In this scenario, the offering decision is made on time of upgrade based on the state of the site at this moment (what applications are on the site at the time). Thus, removing or adding applications after the upgrade cannot affect the decision.

If the user has purchased an application previously as a stand-alone application and the website building system was extended to include a vertical solution that includes this application, and the user then "upgrades" to the new vertical solution, premium package configurer 42 may exclude plans which include applications already installed as standalone.

Alternatively, premium package configurer 42 may include such plans—possibly offering a discount or rebate on the standalone purchase price.

As discussed herein above A/B test applier 49 may check whether user 5 is participating or has previously participated in an A/B test, and if so "roll the dice" and may determine whether to use the A or B version in the given context such as specific plan.

As discussed herein above, vertical solution-specific offerings may "bundle" vertical solution-specific capabilities (such maximal number of items in e-Shop) and standard system capabilities (such as hosting parameters and domain connection). Thus, when user 5 tries to upgrade the specific application, decision engine 37 may check if there is an offering for this application that is bundled with site offering. If yes, decision engine 37 may select a vertical solution plan for the site. If not, decision engine 37 may present a different plan for the application (which does not include any site premium features).

It will be appreciated that at the time of an "upgrade" (when user 5 asks to upgrade), decision engine 37 may gather the relevant data (as required by the rules in the rule database and from the sources noted above) and may determine which offering family to use (which offerings matrix to apply).

In this scenario, decision engine 37 may review all of the applications installed on the current site at the time of the upgrade. Decision engine 37 may ignore applications which are not relevant, i.e. those which are not part of a vertical solution or related to it, those which are in "demo"/"empty" mode, i.e. have not been fully installed and enabled and those which already have a "stand alone" plan on the application level. Based on the remaining applications in the site, decision engine 37 may search for a matching offer according to an appropriate rule.

As discussed here in above, vendor 15 may create as well as edit rules and plans held on CMS 70 via vendor offering editor 16. Vendor 15 may also update premium package features, the prices and currency information as well as add coupons and deals.

Figure 6:
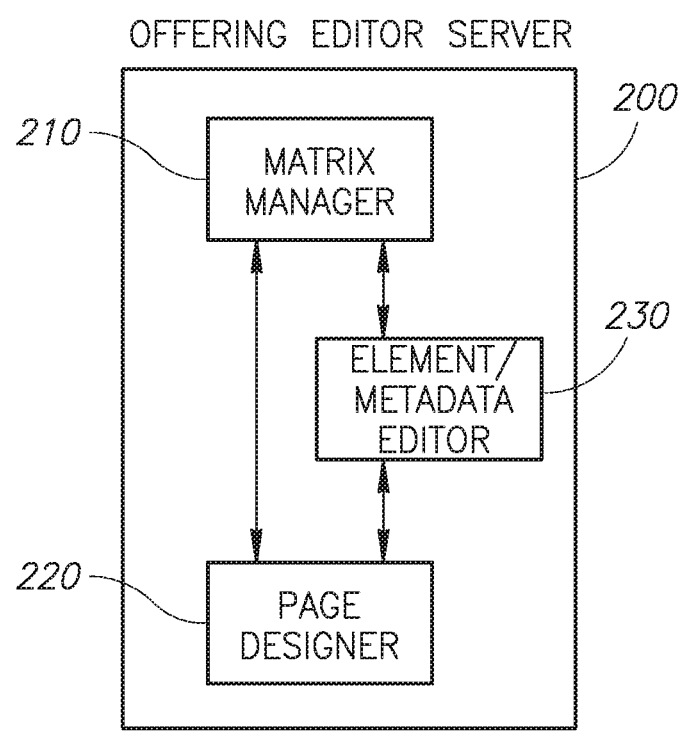
FIG. 6 is a schematic illustration of the elements of the offering editor server of FIG. 1, constructed and operative in accordance with a preferred embodiment of the present invention.

Reference is now made to FIG. 6 which illustrates the elements of offering editor server 200. Offering editor server 200 may comprise a matrix manager 210, a page designer 220 and an element/metadata editor 230. It will be appreciated that any additions and/or modifications to offerings made by vendor 15 may be taken into account by decision engine 37 when creating the final offering. It will also be appreciated that rules determined by vendor 15 may change over time, as multiple sources (such as user feedback and marketing results) may be used to adapt the rules and determine which offerings to provide and what priorities to assign to each plan in the offering as discussed herein above.

Element/metadata editor 230 may allow for the editing, storage and retrieval/use of elements of plans, offerings and associated metadata and visual designs by vendor 15 via vendor offering editor 16. Element/metadata editor 230 may also be subdivided into individual editors for the various stored elements, i.e. a rule editor, plan editor, offering editor, a deal editor and a coupon editor. Each editor may include element editing (e.g. define a premium plan X having parameters A, B, C/define a holiday sale with 20% discount for D, E, F) and visual editing (e.g. "use red bold font for all holiday and yearly sales"). The offering editor may use elements of the website building system visual editor to support plan/offering visual editing (e.g. define offering templates).

As discussed herein above, an offering can be viewed as a matrix in which each offered plan or element is a column and each payment cycle (for example) is a row. An offering may also include multiple payment cycles (monthly, yearly) which may be applied to various plans and elements.

Matrix manager 210 may create and maintain a multidimensional matrix of standard offerings and plans based on some or all of parameters as discussed herein above as generated by analyzer and updater 40, also known as an offerings matrix.

Figure 7:
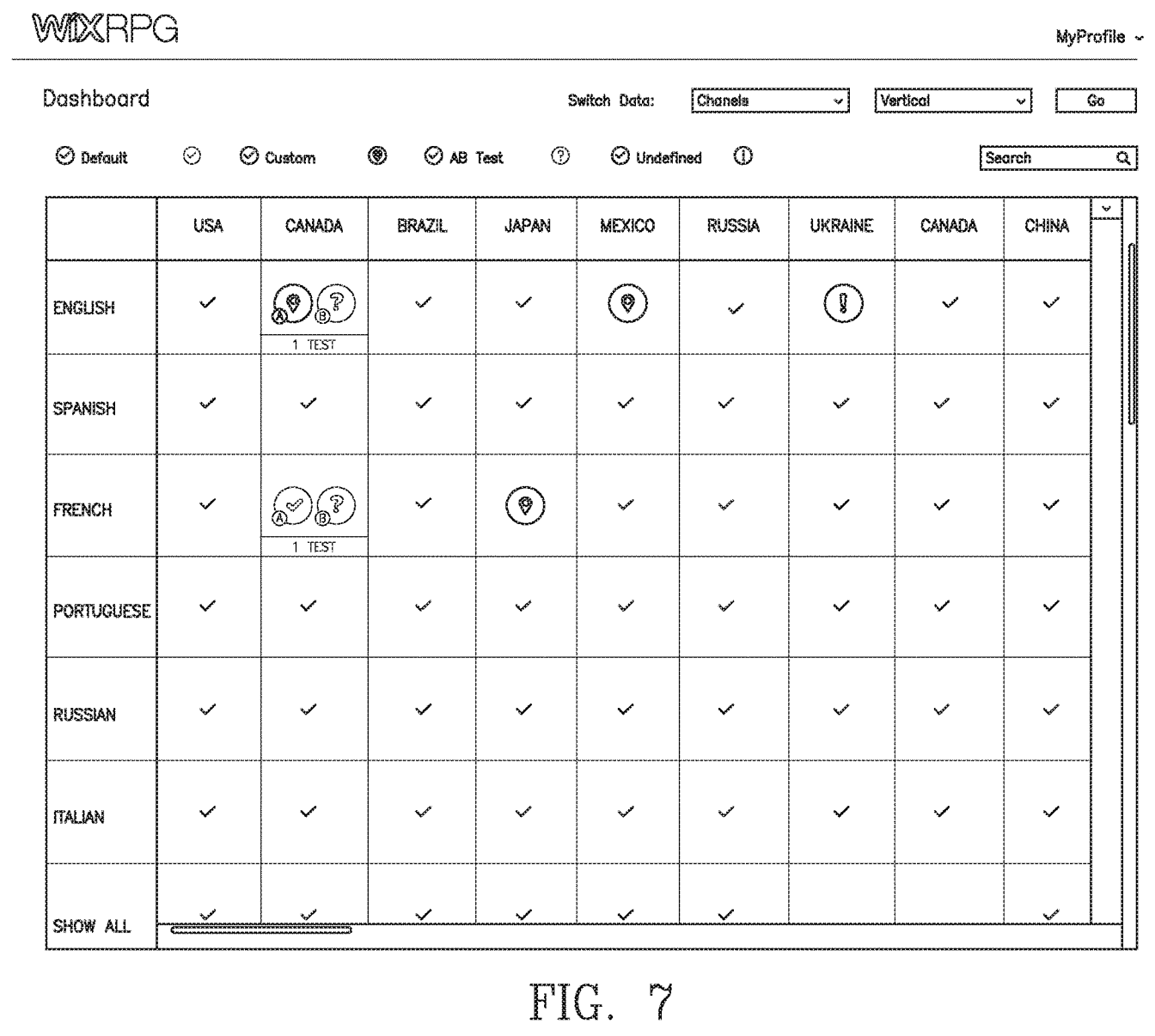

This could be (for example) a 3-dimensional matrix of plans based on the geography of the user, language and source similar to the two dimensional matrix illustrated in FIG. 7 to which reference is now made. As can be seen, the language of each plan is according to the pertinent country. In an alternative embodiment, alternative data organization methods may be used such as a sparse matrix manager or underlying database with per-dimension index field instead of a multi-dimensional matrix.

Thus, the standard offering may include different sets of plans, depending on the cell selected from the offerings matrix noted above and based on the user parameters.

It will also be appreciated that when taking into account the existence of multiple vertical systems, offering system 100 may also be required to maintain an offerings matrix for each vertical system.

In this scenario, vendor 15 may develop a vertical solution for a given market (e.g. a hotels vertical solution), which includes specific features for the specific targeted site owners. Vendor 15 may also like to provide different offerings to the site owners (such as Hotels gold, Hotels silver, etc.)

These vertical solution-specific offerings may include vertical solution-specific features (such as number of room limitations in a hotels vertical solution-specific offering) plus the standard features (from the standard offering). Thus, such a vertical solution-specific offerings may combine a website building system product with a vertical solution-specific product. Furthermore, each such a vertical solution-specific offering may require a user based offerings matrix of its own. For example, a "silver hotel" vertical solution offering (limited to 20 rooms) may include multiple hosting (storage and bandwidth) options suitable to a small hotel. On the other hand, a "gold hotel" vertical solution (limited to 100 rooms) may include multiple options such as larger storage and bandwidth, suitable for a larger hotel.

Page designer 220 may design a page specific to a given set of main user parameters and possibly to a given vertical solution. It may then associate the created page with the relevant plans and premium packages specification defined earlier. Page designer 200 may be based on visual editor provided by the website building system for the creation of regular web pages.

Once package assembler 39 has assembled the best offering for user 5 (including any relevant deals and coupons), channel determiner 50 may determine the best mode of communication to present the determined offerings to user 5 and may instruct marketer 60 accordingly. It will be appreciated that marketer 60 may then generate the offering accordingly either via chat email etc. or may instruct WBS UI sever 80 to present the offering to user 5 via a purpose designed interface.

As discussed herein above, external A/B tester 95 and internal A/B tester 90 may gather data regarding the success of external and internal marketing campaigns. It will be appreciated that the functioning of external A/B tester 95 may be similar to that described in US Patent Publication US 2016/0124839 which implements multiple landing and home pages. It will be further appreciated that, unlike the system described in US Patent Publication US 2016/0124839, external A/B tester 95 may also understand the underlying tested entity (offerings and pricing information).

Although external A/B tester 95 and internal A/B tester 90 may be considered separate entities since they use separate A/B test definitions serving different purposes, they may use similar underlying technology and infrastructure. They may also use similar rule and logic structure.

As discussed herein above, offering system 100 may provide shared control and management for experiments using both elements so a that a vendor 15 employee could, for example, activate a test which includes both a new website building system feature (handled by external A/B tester 95) and a special premium package allowing users to subscribe for the use of a given feature (handled by internal A/B tester 90).

It will be appreciated that A/B tests may be defined at all levels of the offering data hierarchy as described herein above. For example, an A/B test may involve a complete offering (e.g. providing an alternative version of a given offering to some users), or involve a specific feature or element of a given plan (e.g. include a different bandwidth limitation in a given plan for some users).

As discussed herein above, once package assembler 39 has assembled the best final offering for user 5, channel determiner 50 may determine the best mode of communication to present the determined offerings to user 5 and may instruct marketer 60 accordingly.

It will be appreciated that channel determiner 50 may employ pre-defined rules (stored in CMS 70) which may consider the various main user parameters and main site parameters (as discussed herein above) to select the right mode of communication to convey the final offering to user 5. The rules may be based on various user and site main parameters such as the geography of the user and "user color" as described above, as well as knowledge gathered by the system on results of experiments (e.g. users in country X respond better to UI banner ads placed in a certain way).

Figure 8:
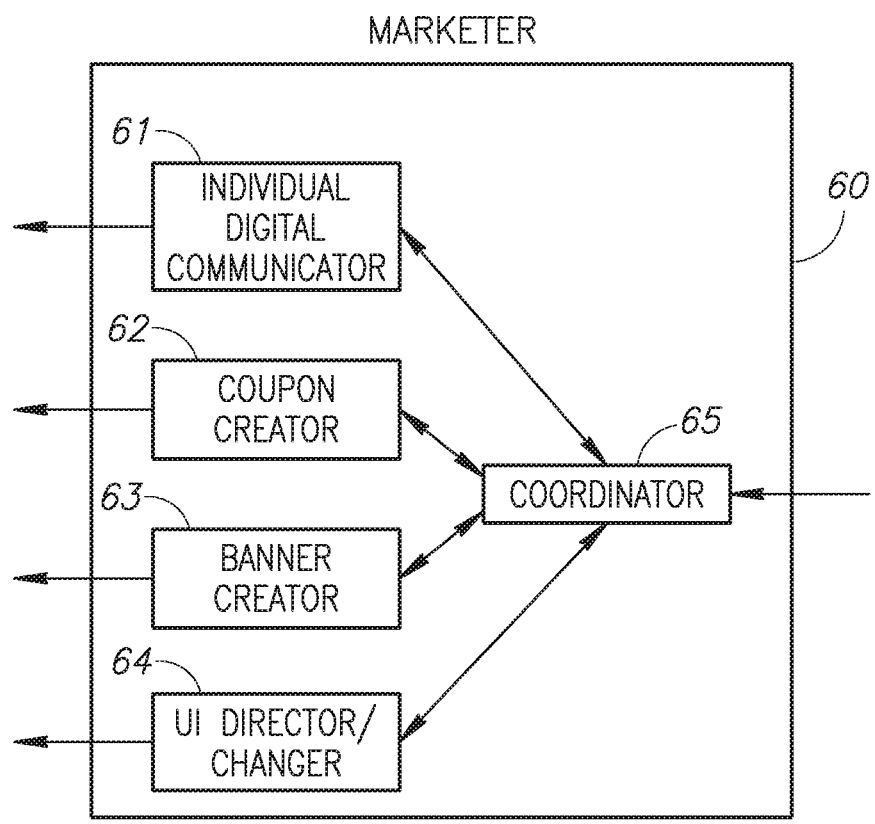
FIG. 8 is a schematic illustration of the elements of the marketer of FIG. 1, constructed and operative in accordance with a preferred embodiment of the present invention.

Reference is now made to FIG. 8 which illustrates the elements of marketer 60. Marketer 60 may comprise an individual digital communicator 61, a coupon creator 62, a banner creator 63, a UI changer/director 64 and a coordinator 65 as discussed in more detail herein below. Coordinator 65 may coordinate the incoming instruction from channel determiner 50 and delegate it accordingly. It will be appreciated that marketer 60 may also comprise other modes of communication and marketing.

It will be appreciated that marketer 60 may use 3 types of marketing for the offerings using both internal and external communication channels to inform user 5 of specific promotions. Internal channels may include a plan picker 85, via the standard UI dashboard of the website building system and via banners, coupons etc. within WBS UI server 80. External channels may include email, Google ads, social media (Facebook advertisements) and web-site banners. Other external channels independent of the website building system as part of an offline marketing campaign may include print ads, television ads and totally offline (such as promotional leaflets).

It will be appreciated that on-line campaigns may point to multiple alternative landing pages/home pages as described in US Patent Publication 2016/0124839. Such landing pages/home pages may (but not always) include specific premium offerings, e.g. a campaign may lead to a new Japanese landing page saying "welcome to our new Japanese version" but without any special premium offering.

As discussed herein above, these offerings may also be made to anonymous (unregistered users). For example, system 100 may create an internal campaign for each specific anonymous user, offering him packages and discounts during a specific period after his sign up.

In such a case, marketer 60 may only promote offers through WBS UI server 80. It will be appreciated that since the user has not provided any contact information at this stage (such as email) there may be no other ways to reach the user.

Marketer 60 may also use external channels on a personal scale so as to notify the user of internal offerings. For example, user 5 may be eligible (based on various user and site parameters) to a certain offering (or coupon). Marketer 60 may present this by modifying WBS UI server 80 to include the offer.

However, marketer 60 may also use external channels to contact the user and notify him of the offer. Such channels may include e-mail, instant messaging, etc. This may be different from the mass-scale mailing or promotion which is part of the regular ("external") marketing campaigns.

It will be appreciated that internal premium marketing and external marketing campaigns are separate in general. However, they may be coordinated. For example, marketer 60 may provide a coordinated display to the user (e.g. in his dashboard) which includes campaigns from both sources. Marketer 60 may also provide a combined control of campaigns and offerings.

It will be further appreciated that there may be a deep integration between the external sales/banners/coupons and the rest of offering system 100. Therefore user 5 may receive such offers or coupons from outside of offering system 100 and he will still see them in his "my account" display of the website building system.

Individual digital communicator 61 may convey the final offering to user 5 via some form of individual digital communication channel such as the email system of vendor 15 with the offering to the stored user 5 email address. Other communication channels may be chat or instant messaging.

Coupon creator 62 may create coupon designs to be displayed in conjunction with the website building system's user interface pages, e.g. using a set of coupon templates or a coupon layout creation algorithm.

Banner creator 63 may create a banner which may be displayed over the website building system's user interface pages.

UI changer/director 64 may instruct WBS UI server 80 to move user 5 to a different page, either during logon or when he is online i.e. to an alternate opening screen or to a pop up screen etc.

It will be appreciated that when user 5 selects a banner or coupon to be used, he may be redirected by WBS UI server 80 to the appropriate registration page for the promotion.

It will be appreciated that the channeling may be fixed, i.e.—the offers are always presented in the same place in the UI (e.g. the "my account" subscriptions display).

However, marketer 60 may also instruct a dynamic display of offers. In particular, WBS UI server 80 may include a dynamically generated UI into which additional sections can be inserted. Such sections may be generated by the selected offering and plans, and may be displayed in the relevant menu areas (e.g. a hotel vertical related offering would be displayed in the "add hotel components" menu).

It will be appreciated that when channel determiner 50 instructs marketer 60 to promote the pertinent offer through WBS UI server 80, plan picker 85 may present the offering to user 5 in matrix format. Reference is now made to FIGS. 8A and 8B which show example screen shots of a typical promotion in which user 5 can pick a plan and payment cycle. FIGS. 8A and 8B show the top and bottom part of a full offering matrix as displayed to user 5. In this example user 5 has selected his plan and payment cycle. It will be appreciated that plan picker 85 may also present the offering in other formats too.

Since plan picker 85 acts as a user interface, it may receive the selection made by user 5 and it may pass this information to updater 48 to be stored as information regarding the particular client to be used in future offer determinations as described herein above.

WBS UI server 80 may create the dynamically generated UI according to the invoked UI sub-menu and the directions provided by the marketer 60 (which take into account the available offers, the current state of the edited web site, and other user and site parameters, including the user's editing history and BI information).

In an alternative embodiment, WBS UI server 80 may also comprise UI dynamic layout manager to re-arrange UI elements according to the techniques presented in US Publication 2013-0219263 entitled "BASED WEB SITE DESIGN SYSTEM INTEGRATING DYNAMIC LAYOUT AND DYNAMIC CONTENT" published 22 Aug. 2013, issued as U.S. Pat. No. 10,185,703 on Jan. 22, 2019 and assigned to the common assignee of the present invention.

Thus tailor made offerings may be calculated for all users of a website building system based on user parameters as well as site parameters, editing history and results of BI analysis together with the results of marketing campaigns and A/B testing and pre-defined rules and plans (all of which are stored in database 71-78) allowing the website building system vendor to promote and encourage use of its system.

Unless specifically stated otherwise, as apparent from the preceding discussions, it is appreciated that, throughout the specification, discussions utilizing terms such as "processing," "computing," "calculating," "determining," or the like, refer to the action and/or processes of a general purpose computer of any type such as a client/server system, mobile computing devices, smart appliances or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. The resultant apparatus when instructed by software may turn the general purpose computer into inventive elements as discussed herein. The instructions may define the inventive device in operation with the computer platform for which it is desired. Such a computer program may be stored in a computer readable storage medium, such as, but not limited to, any type of disk, including optical disks, magnetic-optical disks, read-only memories (ROMs), volatile and non-volatile memories, random access memories (RAMs), electrically programmable read-only memories (EPROMs), electrically erasable and programmable read only memories (EEPROMs), magnetic or optical cards, Flash memory, disk-on-key or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method for a website building system (WBS), the method comprising:
providing a dynamically generated UI (user interface) to replace the regular UI interface for said WBS to present at least one WBS promotional package to a subscribing user of said WBS according to an analysis of main user parameters (MUPs) about said subscribing user and main site parameters (MSPs) about multiple websites built using said WBS, said providing comprising:
storing said MUPs and MSPs in at least one database, said MUPs including business type of said subscribing user and said MSPs including at least information about end user usage of said multiple websites and associated editing history of components of said multiple websites;
analyzing said MSPs and said MUPs;

generating a subscribing user specific offerings matrix comprising cells according to said analyzing, an individual cell representing a WBS promotional package for said subscribing user;

receiving at least one least one WBS promotional package from said generating a subscribing user specific offerings matrix;

rearranging UI elements of said regular WBS interface accordingly to insert said at least one WBS promotional package to provide said dynamically generated UI;

receiving input from said subscribing user for a selected WBS promotional package.

2. The method according to claim 1 wherein said editing history comprises website publishing history and activities performed said subscribing user in said WBS.

3. The method according to claim 1 wherein said MSPs and said MUPs further comprise results of marketing campaigns, results of A/B testing and previous purchases of WBS promotional packages.

4. The method according to claim 1 wherein said at least one WBS promotional package comprises at least one of: plug-ins, pre-defined plans, coupons, associated third party applications, vertical solutions, domain connection options, a visual design, payment cycles and templates.

5. The method according to claim 1 and wherein said at least one WBS promotional package is determined from current session parameters for an anonymous user of said WBS.

6. The method according to claim 1 also comprising applying internal A/B testing on at least one of: visual design, content, and parameters of WBS promotional packages provided by said WBS.

7. The method according to claim 1 also comprising storing at least one of: website parameters of said multiple websites, vertical solutions, said pre-defined plans and rules, results of said internal A/B testing and results of marketing campaigns.

8. The method according to claim 1 wherein said associated business intelligence is according to at least one of: parameters of said subscribing user, parameters of said end users, industries of said websites built by subscribing users of said WBS and associated third party applications.

9. The method according to claim 1 wherein said rearranging UI elements adds at least one of: additional sections and menus to said regular WBS interface.

10. A website building system (WBS), the WBS comprising:
   at least one processor;
   a regular WBS interface; and
   a unit running on said processor to provide a dynamically generated UI (user interface) for said WBS to present at least one WBS promotional package to a subscribing user of said WBS according to an analysis of main user parameters (MUPs) about said subscribing user and main site parameters (MSPs) about multiple websites built using said WBS; said unit comprising:
   at least one database storing said MUPs and MSPs, said MUPs including business type of said subscribing user and said MSPs including at least information about end user usage of said multiple websites and associated editing history of components of said multiple websites;
   an analyzer and updater to analyze said MSPs and said MUPs and to generate a subscribing user specific offerings matrix comprising cells, an individual cell representing a WBS promotional package for said subscribing user;
   a UI server to receive at least one WBS promotional package from said analyzer and updater and to rearrange UI elements of said regular WBS interface accordingly to insert said at least one WBS promotional package to provide said dynamically generated UI; and
   wherein said dynamically generated UI comprises a plan picker to receive input from said subscribing user for a selected WBS promotional package.

11. The system according to claim 10 wherein said associated editing history comprises website publishing history and activities performed by said subscribing user in said WBS.

12. The system according to claim 10 wherein said MSPs and MUPs further comprise results of marketing campaigns, results of A/B testing and previous purchases of WBS promotional packages.

13. The system according to claim 10 wherein said at least one WBS promotional package comprises at least one of: plug-ins, pre-defined plans, coupons, associated third party applications, vertical solutions, domain connection options, a visual design, payment cycles and templates.

14. The system according to claim 10 and wherein said at least one WBS promotional package is based on current session parameters for an anonymous user of said WBS.

15. The system according to claim 10 also comprising an internal A/B test applier to apply internal A/B testing on at least one of: visual design, content, and parameters of WBS promotional packages provided by said WBS.

16. The system according to claim 15 and wherein said at least one database also stores at least one of: parameters of said multiple websites, vertical solutions, pre-defined plans and rules, results of said internal A/B testing and results of marketing campaigns.

17. The system according to claim 10 wherein said associated business intelligence is according to at least one of: parameters of said subscribing user, parameters of end users of said multiple websites, industries of said multiple websites and associated third party applications.

18. The system according to claim 10 wherein UI server adds at least one of: additional sections and menus to said regular WBS interface.

* * * * *